March 16, 1943.    W. J. PHANEUF    2,314,160
ROUGHING BROACH
Filed April 28, 1941
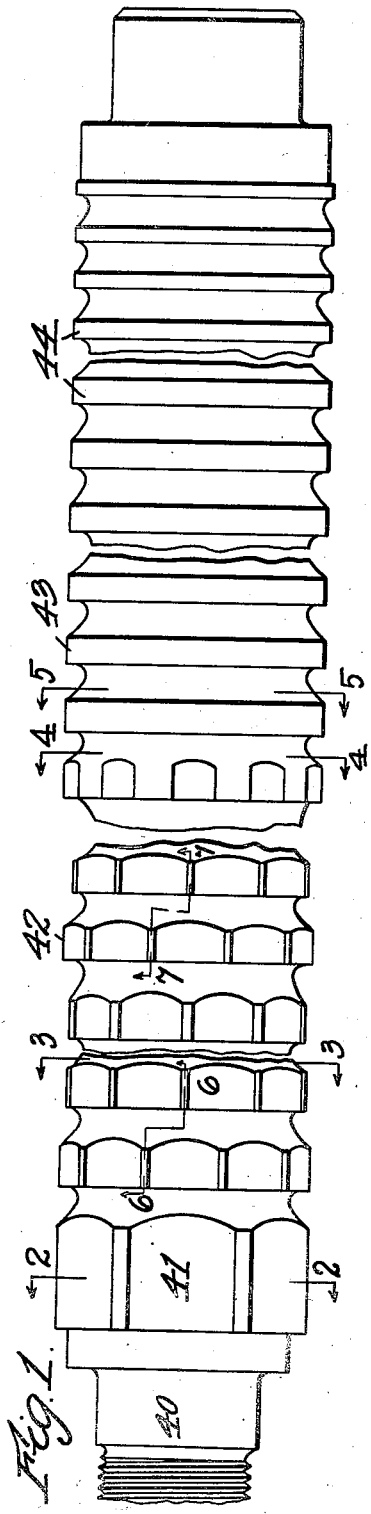
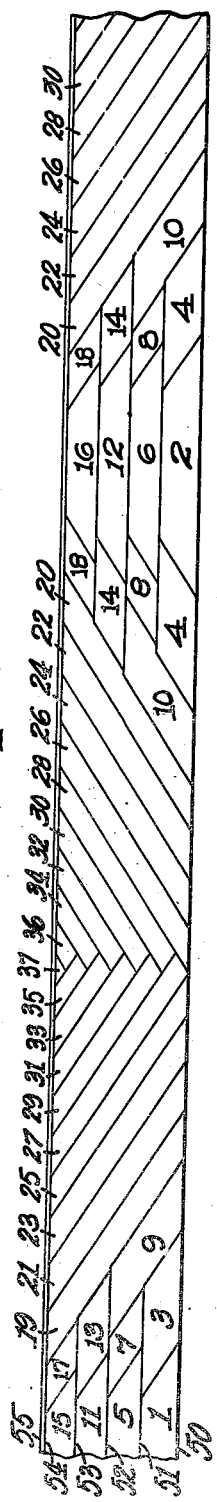
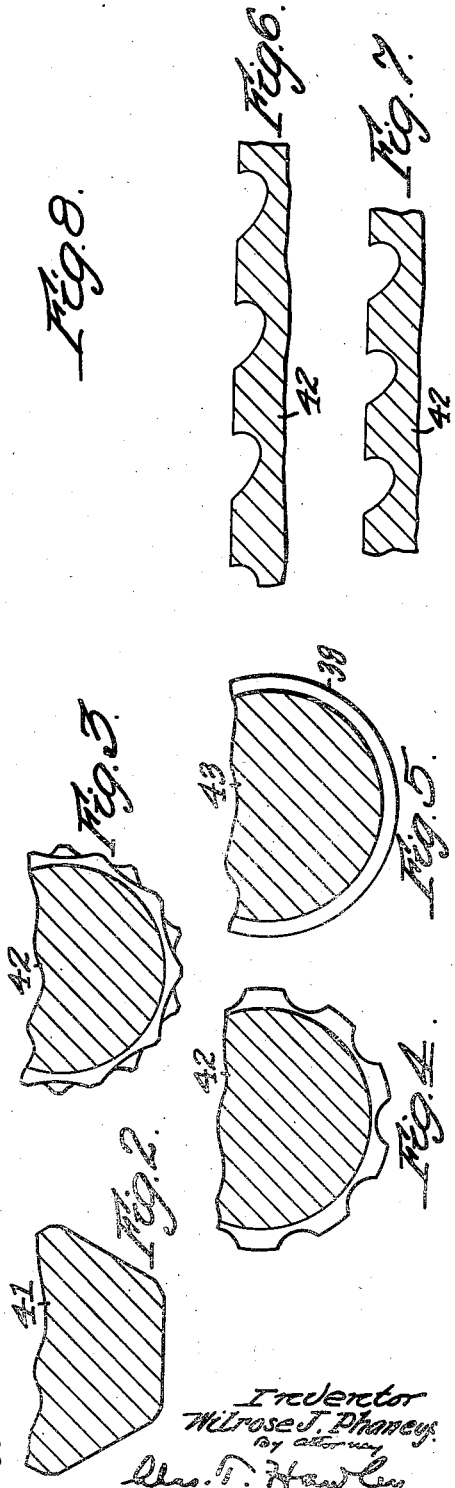

Patented Mar. 16, 1943

2,314,160

UNITED STATES PATENT OFFICE 2,314,160

ROUGHING BROACH

Wilrose J. Phaneuf, Hudson, Mass., assignor to The Lapointe Machine Tool Company, Hudson, Mass., a corporation of Maine Application April 28, 1941, Serial No. 390,845

3 Claims. (Cl. 29—95.1)

This invention relates to a broach specially designed for broaching a rough or cored hole in a piece of metal. In such a broaching operation, it is important that the cutting teeth of the broach remove approximately equal amounts of stock and that each tooth makes a cut of substantial depth, so that every tooth will cut underneath the chilled side wall of a cored hole.

It is the general object of my invention to provide a broach of an improved construction which will have the foregoing advantages when in use. I also provide a broach which produces no side thrust nor twist during the broaching operation. A broach embodying my invention may or may not comprise also a finishing portion for sizing and smoothing the broached hole.

A preferred form of the invention is shown in the drawing, in which

Fig. 1 is a side elevation of my improved broach, with parts thereof cut away to reduce the length;

Figs. 2, 3, 4 and 5 are transverse sectional views, taken along the lines 2—2, 3—3, 4—4 and 5—5 in Fig. 1;

Figs. 6 and 7 are detail sectional views showing tooth profiles and taken along the lines 6—6 and 7—7 in Fig. 1; and Fig. 8 is a diagrammatic sectional view showing the order in which cuts are made by successive teeth in the operation of my improved broach.

Referring to Fig. 1, my improved roughing broach comprises a shank 40, a pilot portion 41, a cuting portion 42, a sizing portion 43 and a finishing portion 44. The shank may be threaded or otherwise machined for attachment to the usual puller head of a broaching machine. The pilot portion 41 may be of any usual section but is shown herein as comprising six relatively narrow flats or guiding surfaces which are located at the angles of a hexagon.

The cutting portion 42 comprises a considerable number of successive cutting units, so arranged that the cutting teeth in the odd-numbered units are disposed in axial alignment, and that the cutting teeth in the even-numbered units are also disposed in axial alignment but offset one-half tooth space from the teeth of the first or odd-numbered units. The successive variations in these units in diameter and in width of cutting edge or point will be hereinafter described.

The periphery of each cutting unit is cut away to provide a relatively deep concave recess between each pair of adjacent cutting teeth, as clearly shown in Figs. 3 and 4.

The final toothed cutting units (Fig. 4) have very wide cutting edges, so that the cuts of these last units almost or quite overlap, and remove the last portions of stock in the roughly broached hole.

These final toothed cutting units are preferably followed by the sizing portion 43 comprising a plurality of units of the circular cross section shown in Fig. 5, with successive units increasing slightly to size the hole. A succession of circular units of uniform diameter in the finishing portion 44 then smooth and finish the hole which has previously been broached and sized.

The relative widths and outside diameters of the teeth in the cutting units of the broach portion 42 are best seen by reference to Fig. 8, in which portions of stock are numbered in the order in which they are removed during a broaching operation, with the odd numbers corresponding to the odd-numbered cutting units in one axial group, and with the even numbers corresponding to the alternate even-numbered cutting units in the second axial group.

Assuming that the inner line 50 (Fig. 8) corresponds approximately to the diameter of the pilot portion 41, the line 51 represents the depth of the cut made by the teeth of the cutting units 1 and 3 in the first axial series and 2 and 4 in the second axial series.

The teeth in the units 5, 6, 7, 8, 9 and 10 then cut to the depth indicated by the line 52 and remove correspondingly numbered portions of stock, as indicated in Fig. 8.

The teeth of the cutting units 11, 12, 13 and 14 then cut to the depth of the line 53 and remove correspondingly numbered additional portions of stock.

The teeth of the cutting units 15, 16, 17 and 18 then remove portions of stock to the depth of the line 54, which represents the outside diameter of the hole produced by the roughing portion of my improved broach. The portions of stock removed are correspondingly numbered from 15 to 18.

The teeth of the cutting units 19 to 37 thereafter remove inclined portions of stock of relatively slight thickness but extending the full depth of the cut, as also indicated in Fig. 8. It will be noted, however, that as the rough broaching operation approaches completion, the cuts overlap, so that the portions of stock removed by each cutting tooth are gradually reduced in length.

After the teeth of the unit 37 remove the last portions of stock within the line 54, the circular cutting unit 38 smooths up the roughly cut hole to the diameter indicated by the line 54.

Successive circular sizing units then gradually increase the diameter to the size of the desired finished hole indicated by the line 55, after which a succession of circular units of uniform size are drawn through the hole for smoothing and finishing in accordance with the usual practice.

From the foregoing description, taken in connection with the diagram shown in Fig. 8, it will be clear that each cutting tooth cuts substantially beneath the cored or chilled surface represented by the line 50, and it will also be evident that approximately uniform amounts of stock are removed by each cutting tooth, at least until the cuts of two adjacent series begin to overlap.

The provision of concave recesses between adjacent cutting teeth in the various cutting units has several important advantages. In the first place, the sides of each cut are thereby made more abrupt, so that the width of cut for each tooth is correspondingly reduced and an increase in the depth of cut is thus made permissible. Furthermore, extra chip space is provided by the relatively deep concave recesses and the recesses in each cutting unit are aligned with the teeth in the preceding unit. The chips produced by the teeth in one unit are thus easily taken care of in the deep concave recesses of the next adjacent unit. A third advantage of the concave recesses lies in the increased cross section of the passages thus provided for cooling or cutting fluid.

In the diagram of Fig. 8, the lines 50 to 55 are drawn straight but it will be understood that in actual practice these lines would be of varying curvature, dependent on the size of the broach.

In this manner, I produce an accurate broached and finished hole in a single operation, and furthermore my improved broach will develop no tendency to twist or turn during a broaching operation.

For the information of the Examiner, a chart is herewith inserted giving the effective diameter of each cutting unit and the circumferential length of the cutting edge of each tooth, for each of the 38 units in the cutting portion 42 of Fig. 1. It will be understood, however, that these dimensions are illustrative only and that they may be widely varied to suit different conditions but all within the scope of my invention.

Tooth chart

| Cutting unit | Outside diameter | Length of tooth edge | Cutting unit | Outside diameter | Length of tool edge |
|---|---|---|---|---|---|
| 1 | 3.275 | .070 | 20 | 3.360 | .150 |
| 2 | 3.275 | .070 | 21 | 3.360 | .190 |
| 3 | 3.275 | .160 | 22 | 3.360 | .190 |
| 4 | 3.275 | .160 | 23 | 3.360 | .230 |
| 5 | 3.305 | .090 | 24 | 3.360 | .230 |
| 6 | 3.305 | .090 | 25 | 3.360 | .270 |
| 7 | 3.305 | .120 | 26 | 3.360 | .270 |
| 8 | 3.305 | .120 | 27 | 3.360 | .310 |
| 9 | 3.305 | .180 | 28 | 3.360 | .310 |
| 10 | 3.305 | .180 | 29 | 3.360 | .350 |
| 11 | 3.335 | .090 | 30 | 3.360 | .350 |
| 12 | 3.335 | .090 | 31 | 3.360 | .390 |
| 13 | 3.335 | .140 | 32 | 3.360 | .390 |
| 14 | 3.335 | .140 | 33 | 3.360 | .430 |
| 15 | 3.360 | .050 | 34 | 3.360 | .430 |
| 16 | 3.360 | .050 | 35 | 3.360 | .470 |
| 17 | 3.360 | .100 | 36 | 3.360 | .470 |
| 18 | 3.360 | .100 | 37 | 3.360 | .510 |
| 19 | 3.360 | .150 | 38 | 3.360 | Round |

Desirable tooth profiles for ordinary broaching operating conditions are shown at Figs. 6 and 7, but it will be understood that the shape of the teeth may be somewhat widely varied to suit operating conditions.

Having thus described my invention and the advantages thereof, I do not wish to be limited to the details herein disclosed, otherwise than as set forth in the claims, but what I claim is:

1. A roughing broach comprising a cutting portion having a plurality of cutting units with teeth in axial alignment and a second plurality of cutting units alternating with the units of said first plurality and with teeth axially aligned in said second plurality but offset one-half tooth space from the teeth of the units in said first plurality, said cutting units being disposed in axially successive groups in each of which groups the units are of uniform outside diameter and of substantially greater outside diameter than the units of the next preceding group, the teeth of the first cutting unit in each group being relatively narrow and the teeth of the succeeding units in said group increasing progressively in width.

2. A roughing broach comprising a cutting portion having a plurality of cutting units with teeth in axial alignment and a second plurality of cutting units alternating with the units of said first plurality and with teeth axially aligned in said second plurality but offset one-half tooth space from the teeth of the units in said first plurality, said cutting units being disposed in axially successive groups in each of which groups the units are of uniform outside diameter and of substantially greater outside diameter than the units of the next preceding group, the teeth of the first cutting unit in each group being relatively narrow and the teeth of the succeeding units in said group increasing progressively in width, and the last group having additional units with progressively wider teeth which take full-depth cuts at the sides of the cuts made by the preceding groups until adjacent cuts overlap.

3. A broach as set forth in claim 2, in which a plurality of circular sizing and finishing units are provided to follow said cutting units and to remove a thin additional band of stock.

WILROSE J. PHANEUF.